(12) United States Patent
Tsutsumi et al.

(10) Patent No.: US 6,896,344 B2
(45) Date of Patent: May 24, 2005

(54) GUIDING AND HOLDING JIG FOR A FLEXIBLE CONNECTOR IN A PULL-OUT UNIT

(75) Inventors: Kazuhiro Tsutsumi, Osaka (JP); Akihiko Utaki, Osaka (JP); Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/690,310

(22) Filed: Oct. 21, 2003

(65) Prior Publication Data

US 2004/0090159 A1 May 13, 2004

(30) Foreign Application Priority Data

Nov. 11, 2002 (JP) ........................................ 2002-327008

(51) Int. Cl.[7] ............................................... A47B 88/00
(52) U.S. Cl. .............................. 312/330.1; 312/223.1; 312/223.6; 312/223.2; 59/78.1; 248/51
(58) Field of Search ........................... 312/223.1, 223.6, 312/223.2, 330.1; 248/51, 52, 53; 361/725, 727; 59/78.1

(56) References Cited

U.S. PATENT DOCUMENTS

| | | | | |
|---|---|---|---|---|
| 4,009,919 A | * | 3/1977 | Raasch ........................ 312/268 |
| 4,462,565 A | * | 7/1984 | Johnson ........................ 248/51 |
| 4,625,507 A | * | 12/1986 | Moritz et al. ................. 59/78.1 |
| 4,625,936 A | * | 12/1986 | Hadden, Sr. ................. 248/544 |
| 5,169,223 A | * | 12/1992 | Suzuki et al. ............. 312/330.1 |
| 5,460,441 A | * | 10/1995 | Hastings et al. ............ 312/298 |
| 5,649,415 A | * | 7/1997 | Pea ............................. 59/78.1 |
| 6,029,437 A | * | 2/2000 | Hart .............................. 59/78 |
| 6,065,278 A | * | 5/2000 | Weber et al. ................. 59/78.1 |
| 6,142,590 A | * | 11/2000 | Harwell .................... 312/223.1 |
| 6,349,534 B1 | * | 2/2002 | Zanolla et al. ............... 59/78.1 |
| 6,425,238 B1 | * | 7/2002 | Blase ......................... 59/78.1 |

* cited by examiner

Primary Examiner—Peter M. Cuomo
Assistant Examiner—Erika Garrett
(74) Attorney, Agent, or Firm—Dann, Dorfman, Herrell and Skillman, P.C.; Henry H. Skillman

(57) ABSTRACT

A guiding and holding jig for a flexible connector such as a cable and/or the like in a pull-out unit for use where the diameters and the number of the connectors may be different. The jig includes holding frames which can be easily substituted. The guiding and holding jig comprises linear links to which holding frames, which support the connector at a position spaced outwardly from the bodies of the links, are removably attached and hinge members pivotally connecting the linear links to each other. The jig retracts and extends the connector without causing sharp bends while holding it in the holding frames as the pull-out unit is moved in or out. In cases there are a large number of connectors, large holding frames are used.

11 Claims, 10 Drawing Sheets

GUIDING AND HOLDING JIG FOR A FLEXIBLE CONNECTOR IN A PULL-OUT UNIT

TECHNICAL FIELD TO WHICH THE INVENTION PERTAINS

The present invention relates to a guiding and holding jig for guiding and holding a flexible connector, such as a cable and/or the like, mounted between a case body and a pull-out unit accommodated in said case body so as to permit pulling out and retracting the unit without causing sharp bends, breaks or creases in the flexible connector.

BACKGROUND OF THE INVENTION

As shown in FIG. 12, a known guiding and holding jig 1 for guiding and holding a flexible connector 4 is mounted between a case body 2 and a pull-out unit 3 accommodated in the case body 2 so as to permit pulling out and retracting the unit. In the guiding and holding jig 1, the flexible connector 4 is secured to a sheet metal supporting jig 5 with a string 6 and this sheet metal supporting jig 5 is articulately connected to a hinge 7 comprising two plates 7a connected with one pin 7b.

PROBLEMS TO BE SOLVED BY THE INVENTION

However, since in the above-mentioned flexible connector guiding and holding jig 1 the sheet metal supporting jig 5 is attached to the hinge 7 using the one pin 7b as a pivot shaft, the sheet metal is sharply bent during the articulating of the hinge 7. Thus, there is a problem that during the articulation or bending of the hinge 7 the flexible connector 4 is broken by application of tension to the flexible connector 4 secured to the sheet metal supporting jig 5 with the string 6, or by sharp bending of the hinge 7.

Further, since the flexible connector 4 is secured to the sheet metal supporting jig 5 with the string 6, when a number of electric cords, cables and the like are used, or when the diameter of the flexible connector 4 is large, or when the mass of the flexible connector 4 is large, there is a problem that the work of securing portions of the flexible connector 4 to the sheet metal supporting jig 5 is not easy thereby becoming complicated.

Accordingly, the object of the invention is to solve the above-described prior art problems and to provide a flexible connector guiding and holding jig, in which excessive tension cannot be applied to a flexible connector during retraction or extension of the pull-out unit, and at the same time, even in a case where the diameters and the number of the flexible connectors are different from each other, a holding frame can be easily changed to a new holding frame suitable for the size of the flexible connector. This holding frame can take a simple structure.

SUMMARY OF THE INVENTION

To attain said objects as a solving means of said problems, the present invention is configured such that a flexible connector is supported by holding frames attached to links and the links are connected to each other through a hinge member.

The present invention comprises a guiding and holding jig for guiding and holding a flexible connector mounted between a case body and a pull-out unit accommodated in said case body for retraction and extension, characterized in that said flexible connector guide holding jig comprises: at least two links, each having pin holes on their both ends through which connecting pins are inserted, and to which holding frames supporting said cable and/or like were removably attached, and a hinge member, having pin holes on its both ends through which connecting pins are inserted, and to which holding frames supporting cables and/or like were removably attached; and by connecting said links to said connecting pins through said hinge members, said links bend-move said flexible connector while holding the flexible connector in accordance with the extension or retraction of the pull-out.

An embodiment of the present invention is configured such that the drawing flexible connector guiding and holding jig is characterized in that said links are provided in a vertically overlapped or superimposed manner.

The holding frames of the present invention are configured such that the flexible connector can be inserted or removed, at the side or upper portion of the holding frame.

The flexible connector guide holding jig comprises: at least two links, each having pin holes on their both ends through which connecting pins are inserted, and to which holding frames supporting said cable and/or like were removably attached, and a hinge member, having pin holes on its both ends through which connecting pins are inserted, and to which holding frames supporting cables and/or like were removably attached; and by connecting said links to said connecting pins through said hinge members said links bend-moves said flexible connector while holding the flexible connector in accordance with extension or retraction of said pull-out unit. Accordingly, excessive tension is not applied to the flexible connector supported by the holding frames, and only by appropriately changing holding frames removably attached to new ones, different size flexible connector having different diameters and different numbers can be held, whereby the holding frames for the flexible connector can be changed to those having simple structures.

In accordance with another feature of the present invention, the holding frames serve as stand-off units to support the flexible connector spaced outwardly from the links and the hinge members, so as to enlarge the radius of curvature of the connector as it is bent by articulation of the hinge members.

Preferably, there are a plurality of hinge members between adjacent links, to provide a large bending radius to the flexible connector as the jig is articulated during retraction and extension of the pull-out unit.

EMBODIMENTS OF THE INVENTION

Figure 1:
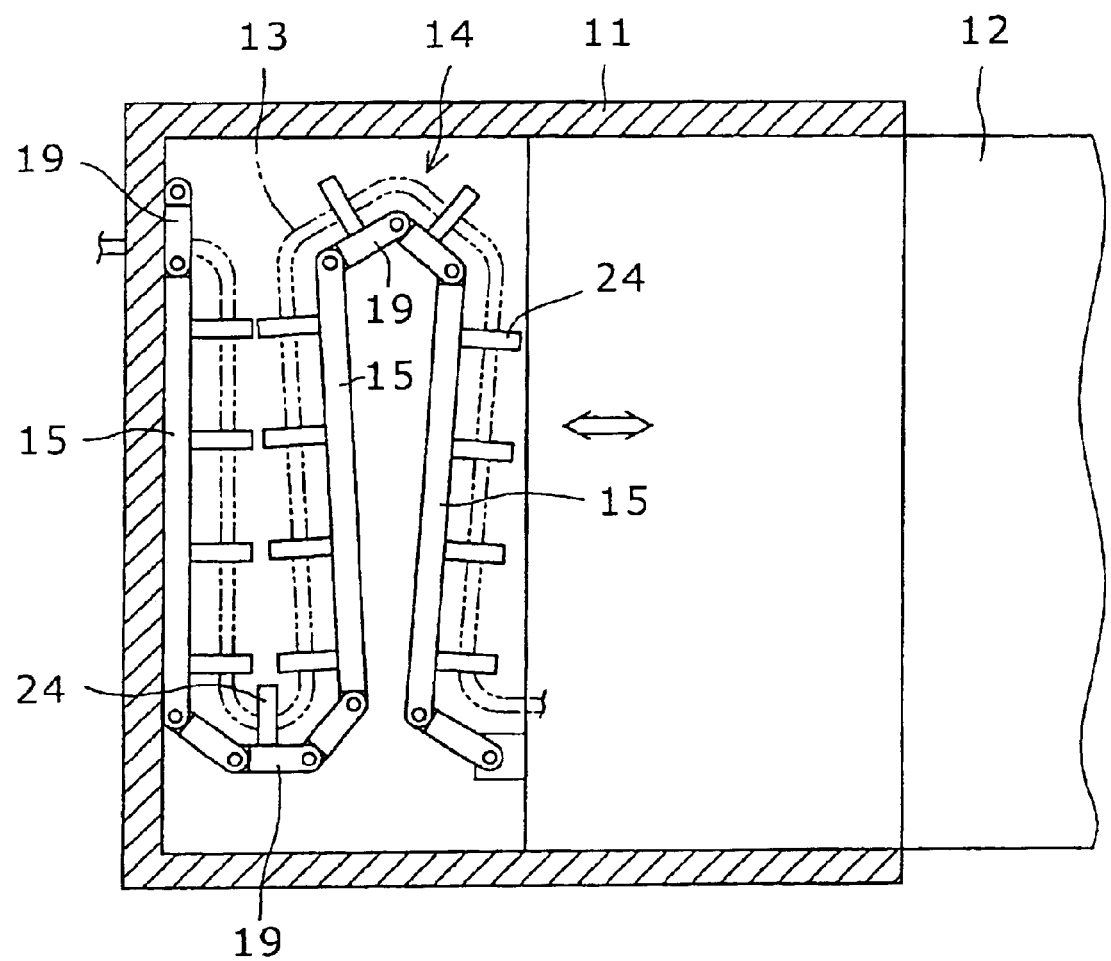
FIG. 1 is a conceptional view of a flexible connector guiding and holding jig showing a first embodiment according to the present invention.

As shown in FIG. 1, the first embodiment has a drawing or a pull-out unit 12 accommodated into a case body 11 in a drawable manner, i.e. for extension and retraction. This case body is, for example, a desk used in an office. The drawing unit 12 is a pull-out drawer, tray or the like for electronic office equipment accommodated under the desk and capable of extension and retraction if necessary. The electronic office equipment referenced in this specification is a personal computer body, monitor, keyboard, printer or the like.

The case body 11 and the drawing unit 12 are not limited to the above-mentioned components, and may be a tray or a pull-out drawer including a base and any electric or electronic machine equipment provided on the base. Additionally in the case body 11 and the drawing unit 12 include any components necessary for connecting flexible connectors such as a power source cord, a signal input/output cable, a signal line for a sensor, an optical fiber, a pipe for liquid or air, or a bundle of such items or the like, which extend between the case body and the pull-out unit.

In FIG. 1, a flexible connector 13 such as a power source cable or a signal flexible connector is accommodated between the rear inside of the case body 11 and the rear outside of the drawing unit 12 while being held by a guiding and holding jig 14.

The flexible connector guiding and holding jig 14 schematically comprises links 15 to which holding frames 24 are attached, and hinge members 19, which connect the links 15 to each other for extension and retraction without causing sharp bends, breaks or creases in the flexible connector. Thus, the flexible connector 13 can be bent by the hinge members 19 in a curved manner. The frames serve as stand-off elements to position the flexible connector 13 spaced away from the bodies of the links 15 and the hinge members 19, so as to increase the radius of curvature in the curved connector during articulation of the hinges.

Figure 2:
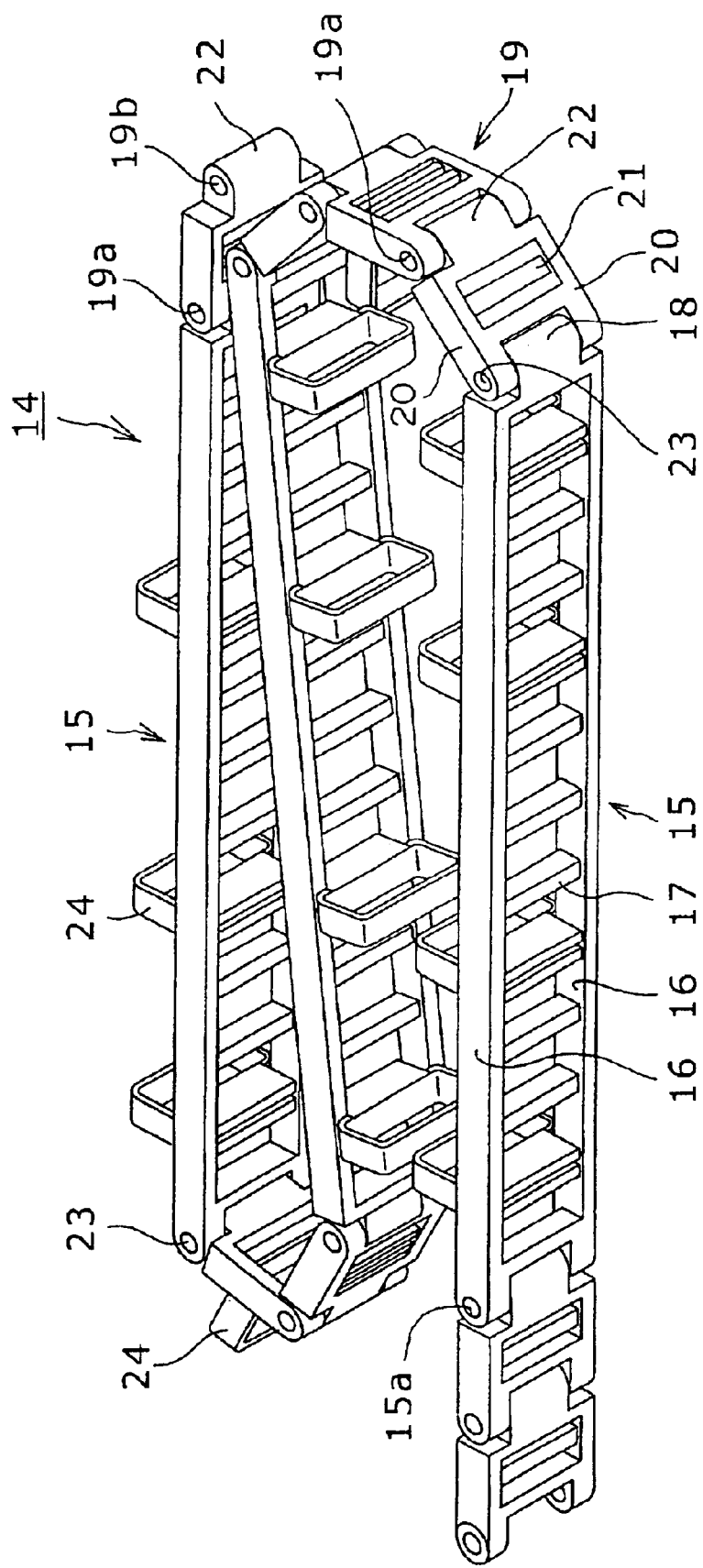
FIG. 2 is a perspective view of the guiding and holding jig in FIG. 1.

The link 15 comprises spaced and opposed linear arms 16 and a plurality of transverse stiles or bridges 17 between the arms 16 as shown in FIG. 2. At the both ends of the link 15 are provided pin holes 15a through which connecting pins 23 are inserted. That is, one pin hole 15a is cut out in one end portion of the arm 16 and the other pin hole (not shown) is cut out in an expanded portion 18. The transverse stiles or bridges 17 of the link 15 removably mount holding frames 24, which support the flexible connector at suitable pitch intervals.

The hinge member 19 is composed of a pair of comparatively short arms 20 as compared with the arm 16 of the link 15, and comprises a transverse stile or bridge 21 and an expanded portion 22, as shown in FIG. 2. Both ends of the hinge member 19 include pin holes 19a and 19b, into which connecting pins 23 are inserted respectively. That is one pin hole 19a is cut out in one end of the arm 20 and the other pin hole 19b is cut out in an expanded portion 22 in the other end of the arm 20. This hinge member 19 removably mounts a holding frame 24, which supports the flexible connector appropriately.

Figure 3:
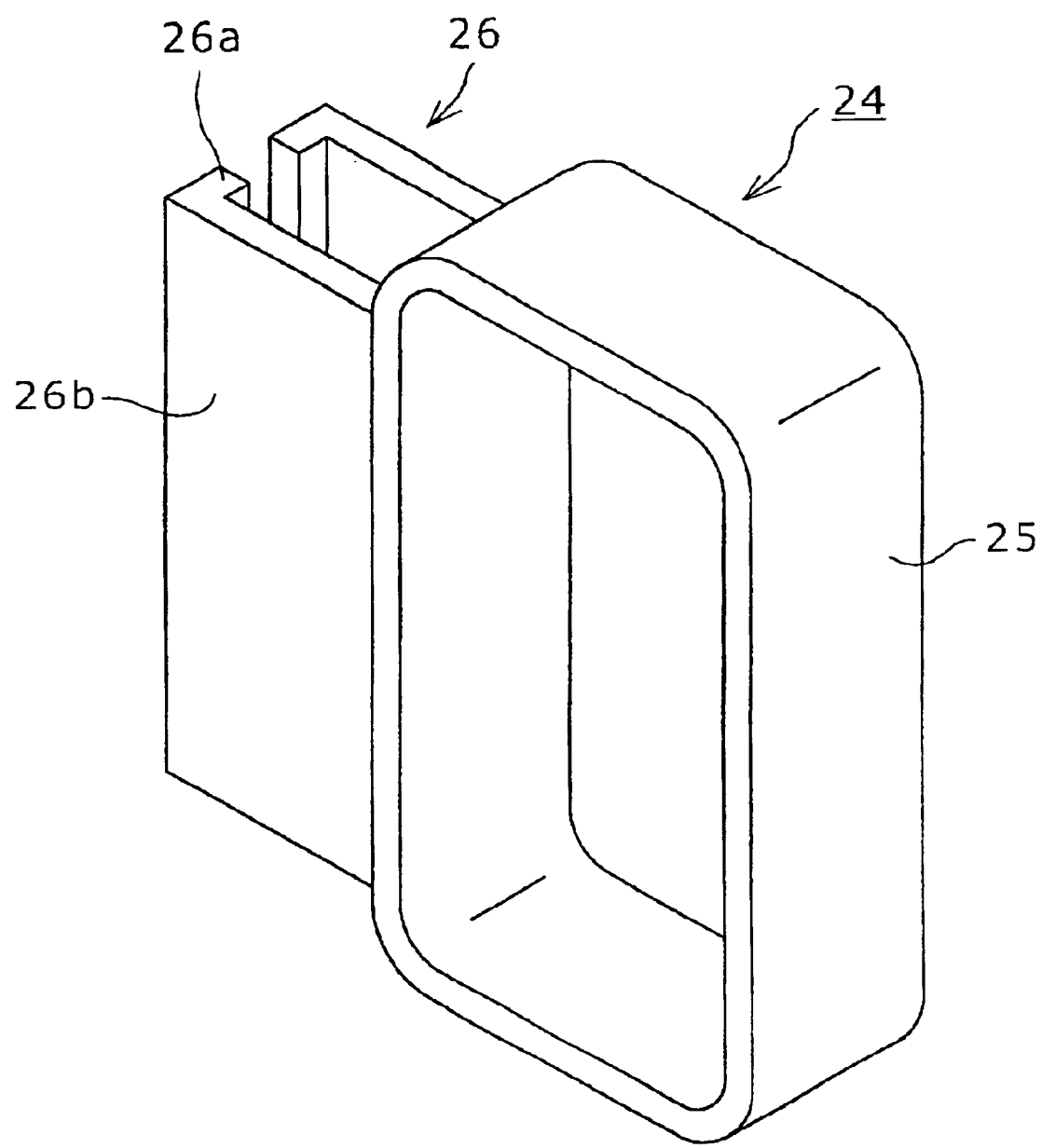
FIG. 3 is a perspective view of the holding frame in FIG. 2.

The holding frame 24 comprises a frame body 25 and a mounting portion 26 formed on one side of this frame body 25 as shown in FIG. 3. The mounting portion 26 comprises a pair of plates 26b each having an engagement portion 26a at the edge portion of the mounting plate portion 26a. This holding frame 24 can be easily attached to the transverse stiles 17 and 19 of the link 15 and the hinge member 19 respectively by fitting its mounting portion 26 thereto.

Figure 8:
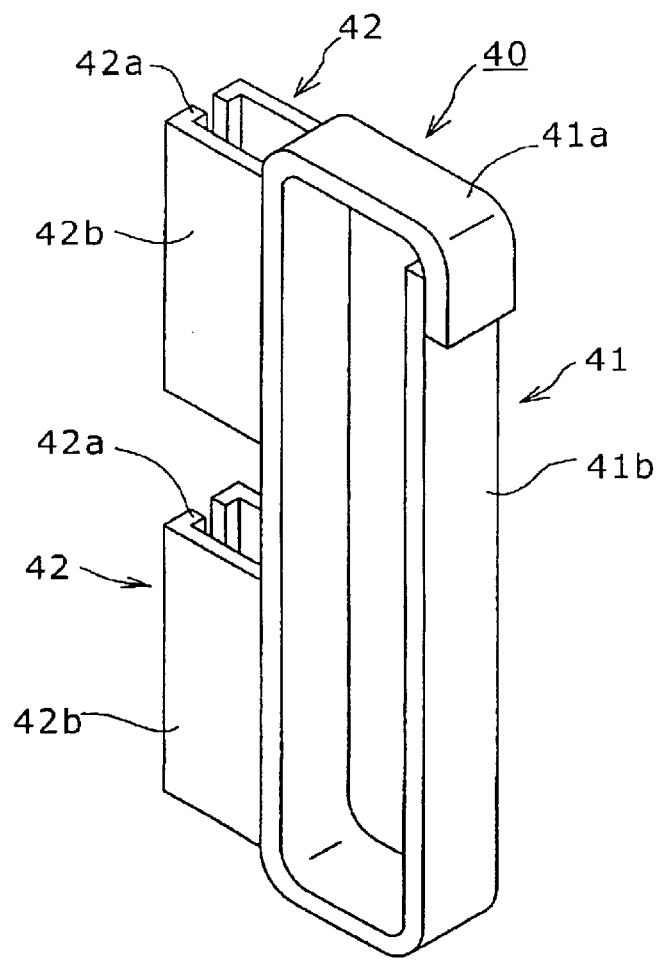
FIG. 8 is a perspective view of the holding frame of the third embodiment.
Figure 9:
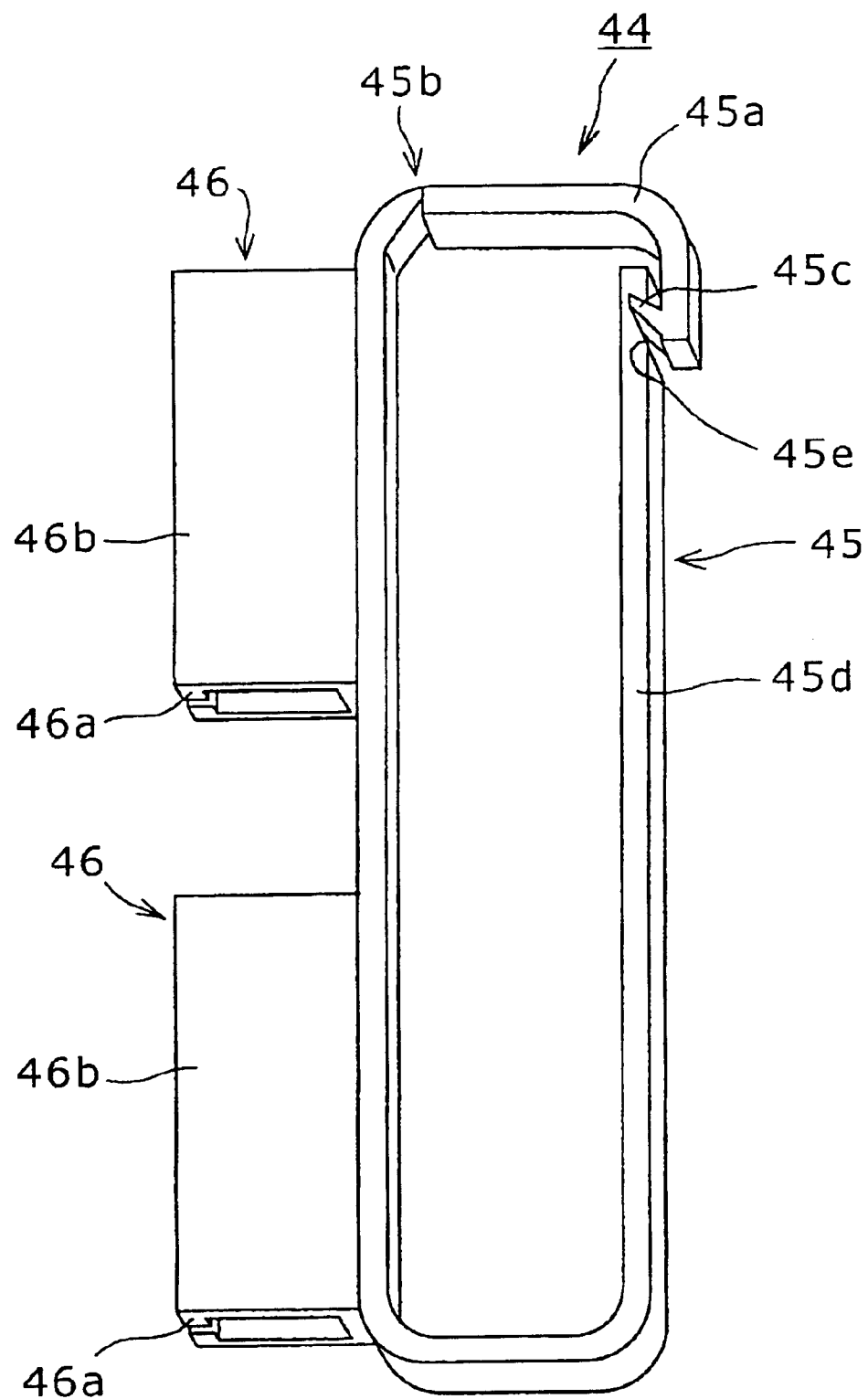
FIG. 9 is a perspective view of a holding member of a modified example of the third embodiment.
Figure 10:
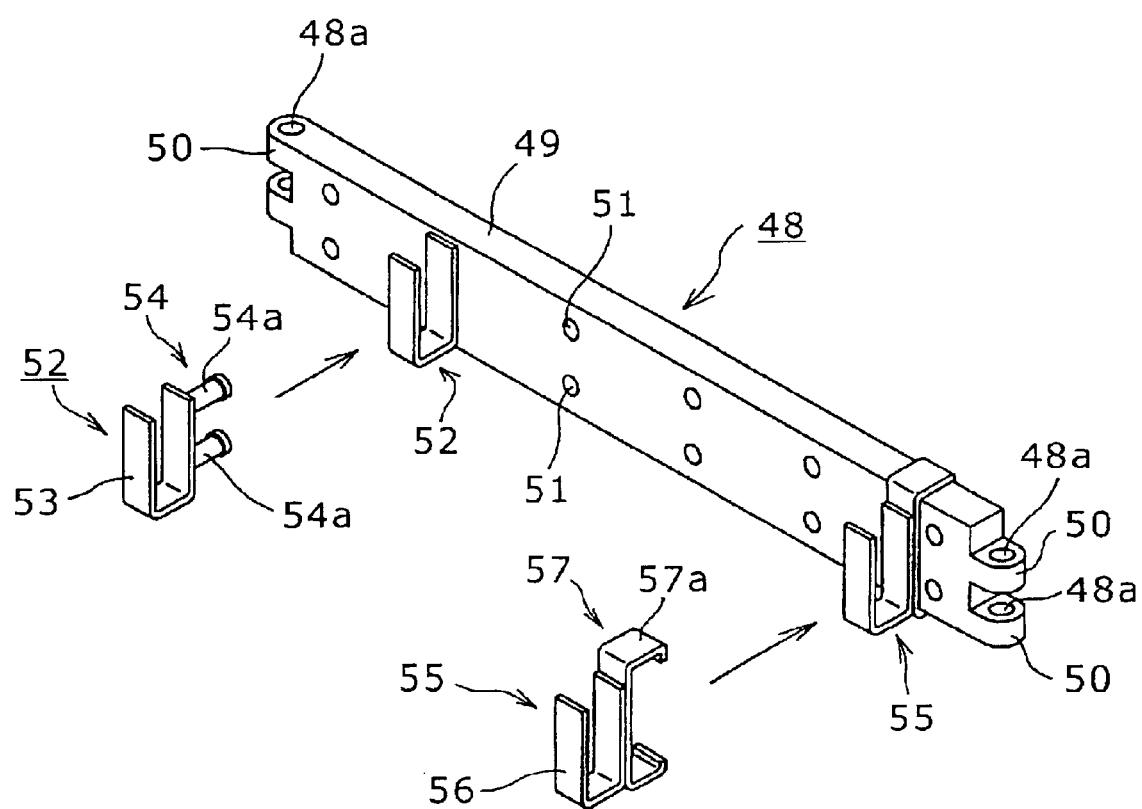
FIG. 10 is a perspective view of a link showing a fourth embodiment.

In the first embodiment, the frame body 25 of the holding frame 24 has a closed receiver as an integral member for enclosing and surrounding the flexible connector 13. However, as the holding frame, shapes as shown in FIGS. 8, 9 and 10, which are later described in detail, may have an open or openable receiver so that the flexible connector can be inserted into or removed from the side or the upper portion. In this case, replacement of the flexible connector 13, or addition thereof and the like can be easily performed.

The flexible connector guiding and holding jig 14 comprising the above-mentioned link 15 and the hinge portions 19 is formed by connecting a plurality of links 15 through suitable number of hinge members 19. In this case, the leading and trailing terminal edge portions of the flexible connector guiding and holding jig 14 have hinge portions, which function as securing members. The hinge members 19 are connected to the case body 11 and the pull-out unit 12, respectively.

The flexible connector guiding and holding jig 14 having the above mentioned configuration exhibits the following actions and effects. The flexible connector 13 is mounted between the case body 11 and the pull-out unit 12, which is accommodated in the case body for extending and retracting without causing sharp bends, breaks or creases in the flexible connector. The connector 13 is supported by holding frames 24 attached to the link 15 and the hinge member 19. The guiding and holding jig 14 supporting this flexible connector 13 is bend-moved while holding the flexible connector 13 in accordance with the retraction and extension of the pull-out unit 12.

In this case, since the flexible connector 13 is supported and is not restrained by the holding frames 24, even if the guiding and holding jig 14 is bent or articulated, excessive tension is not applied to the flexible connector, whereby breakage of the flexible connector 13 due to tension is prevented. Further, in the bent or articulated portion, since the links 15 are connected to each other through a hinge member 19 comprising a pair of arms 20 with two spaced connecting pins 23, the flexible connector 13 can be bent in a curved shape without causing sharp bends or creases whereby breakage of the flexible connector 13 due to sharp bending or articulation is also prevented.

Since the holding frames 24 supporting the flexible connector 13 are removably attached to the transverse stile 17 of the link 15 and the transverse stile 21 of the hinge member 19 by the mounting portion 26, respectively, a simple change or substitution of the holding frame 24 to a different size holding frame 24 permits holding different size flexible connectors having different diameters and changing the number thereof.

Further, since the holding frame 24 is attached to the transverse stile 17 of the link 15 and the transverse stile 21 of the hinge member 19 by fitting the respective mounting portions 26 thereto, it can be attached to any one of a front surface, a rear surface and both surfaces of the link 15, so that a number of flexible connectors can be held without changing the size of the holding frame 24.

The holding frame 24, which supports the flexible connector 13, only supports it within the frame body. Thus, the frame body that is the holding frame can be made in a simple structure. Therefore, simply the change of size of the frame body permits application for connectors 13 having different sizes.

Further, the link 15 is formed by attaching a plurality of transverse stiles 17 between spaced and opposed linear arms 16 and the holding frame 24 is attached to the transverse stile 17, the ventilation conditions are improved by the spaces between the transverse stiles 17 whereby heat radiation of the flexible connector 13 can be efficiently performed.

The second embodiment of the present invention will be described with reference to FIGS. 4 to 6. The flexible connector guiding and holding jig of the second embodiment corresponds to one in which the link 15, and the hinge member 19, which functions as a fixing member, were changed in the flexible connector guiding and holding jig 14 of the first embodiment. Thus, with the flexible connector guiding and holding jig (the entire view not shown) of the second embodiment changed members in the flexible connector guiding and holding jig 14 of the first embodiment will be described principally.

Figure 4:
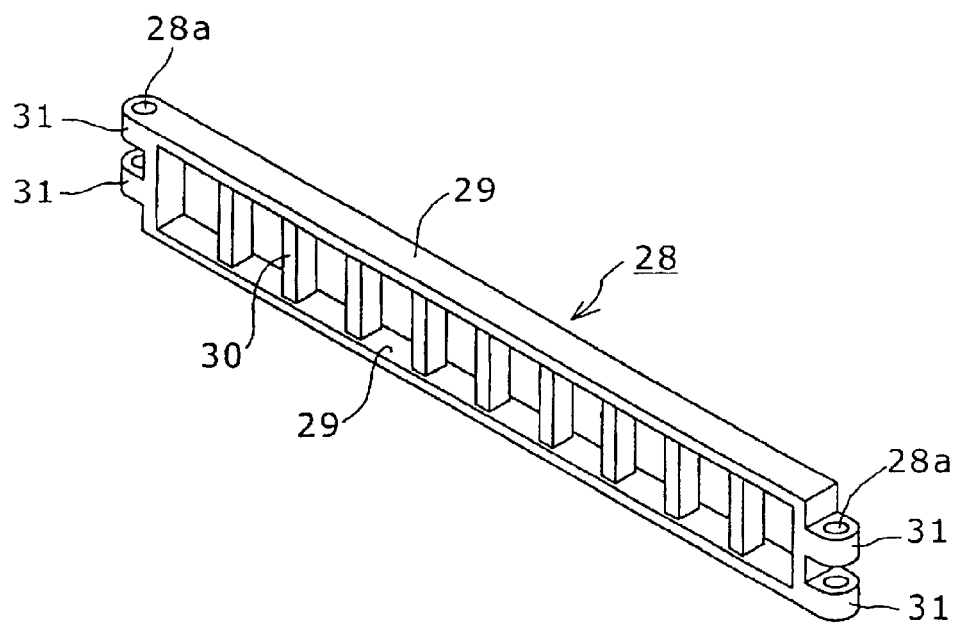
FIG. 4 is a perspective view of a link showing a second embodiment.

A link 28 comprises, as shown in FIG. 4, spaced and opposed linear arms 29 and transverse stiles or bridges provided between the arms 29. At the both ends of the link 28 are provided pin holes 28a through which connecting pins 23 are inserted. That is, pin holes 28a are cut out in expanded portions 31 formed on the both end portions of the link 28. Like The first embodiment holding frames, which support the flexible connector, are removably attached to the transverse stiles or bridges 30 of the link 28 at suitable pitch intervals.

Figure 5A:
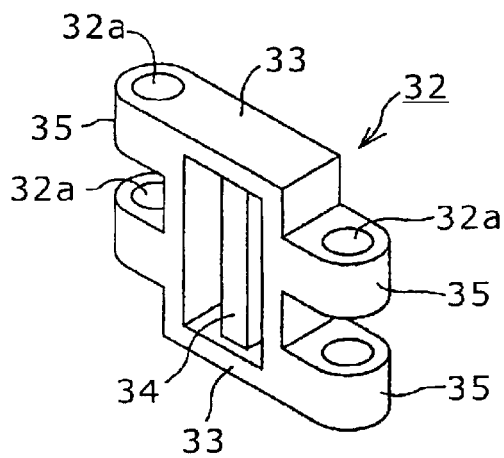
FIG. 5(A) is a perspective view of a hinge member of the second embodiment.
Figure 5B:
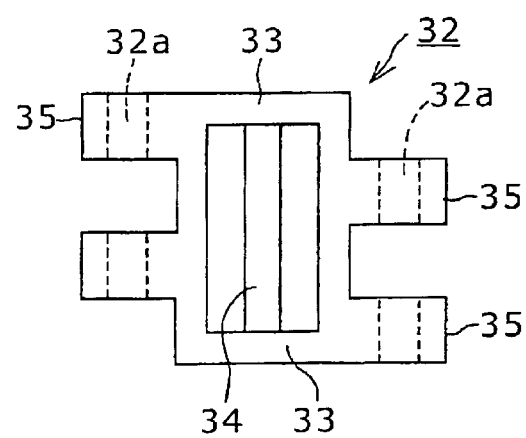
FIG. 5(B) is a side view of FIG. 5(A).

As shown in FIGS. 5(A) and 5(B), a hinge member 32 is formed of a pair of short arms 33 as compared with the arm 29 of the link 28 and includes a transverse stile or bridge 34 and upper and lower, i.e. two stepped expanded portions 35. The both ends of the hinge member 32 include pin holes 32a into which connecting pins are inserted respectively. Like The first embodiment, to the transverse stile 34 of this hinge member 32 is removably provided a holding frame, which supports the flexible connector appropriately.

Figure 6A:
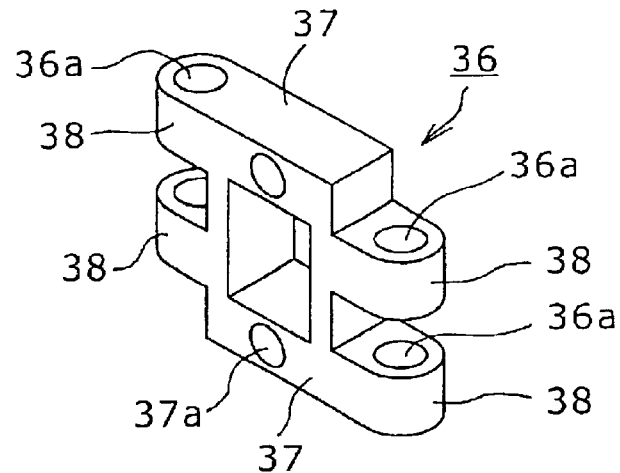
FIG. 6(A) is a securing member of the second embodiment.
Figure 6B:
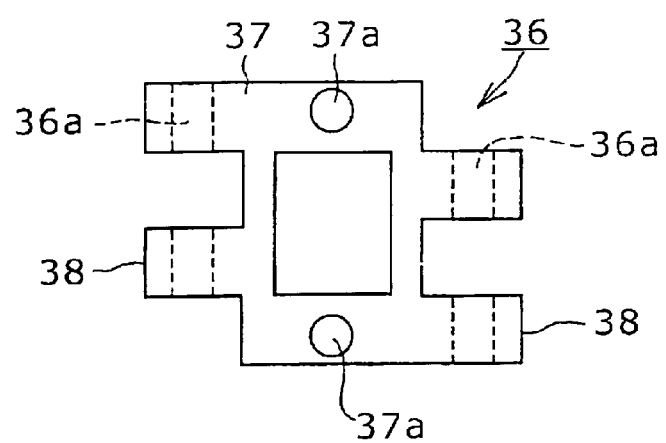
FIG. 6(B) is a side view of FIG. 6(A).
Figure 6C:
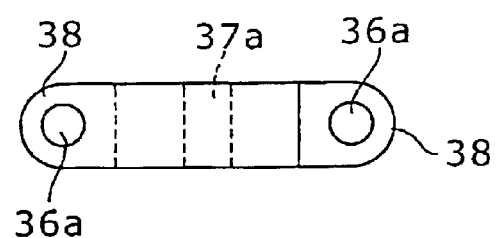
FIG. 6(C) is a plan view of FIG. 6(A).

To the leading edge and the trailing edge of the flexible connector guiding and holding jig are connected securing members 36, which attach the guiding and holding jig to the case body and the pull-out unit. Each of these securing members 36 has, as shown in FIGS. 6(A), 6(B) and 6(C) substantially the same profile as the hinge member 32, and is composed of a pair of arms 37 each having a mounting hole 37a for mounting it on the case body or the pull-out unit, and includes upper and lower, i.e. two-stepped expanded portions 38. Further, the both ends securing member 36 are provided with pin holes 36a, through which connecting pins are inserted, respectively.

The flexible connector guiding and holding jig of the second embodiment is formed by connecting the plurality of links 28 to each other with connecting pins through a suitable number of hinge members 32. In this case, to the leading edge and the trailing edge of the flexible connector guiding and holding jig are connected securing members 36, and the securing members 36 are attached to the case body and the pull-out unit, respectively. The flexible connector guiding and holding jig of the second embodiment exhibits the same actions and effects as the flexible connector guiding and holding jig of the first embodiment.

Figure 7:
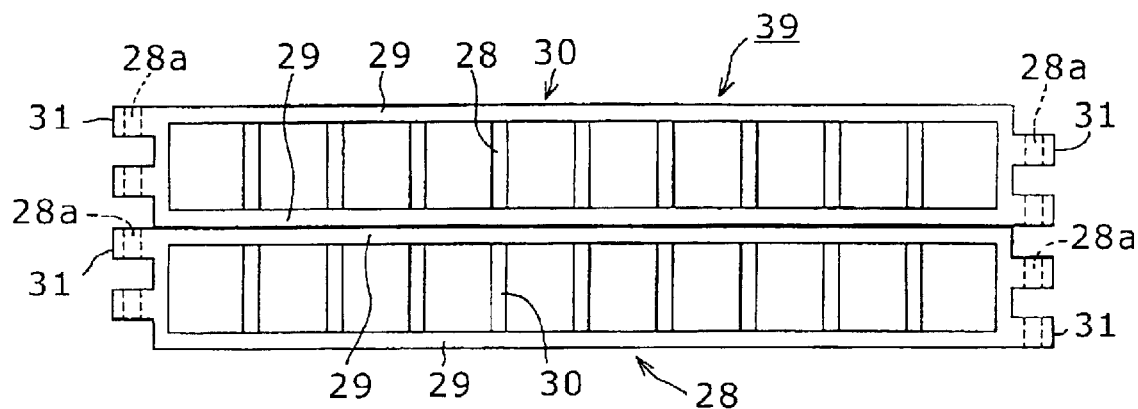
FIG. 7 is a side view of a link showing a third embodiment.

A third embodiment of the present invention will be described with reference to FIGS. 7 and 8. A flexible connector guiding and holding jig of the third embodiment is formed by overlapping or superimposing the links of the second embodiment vertically. Members common to the second embodiment will be described by denoting the same reference numerals.

A link 39, which forms a flexible connector guiding and holding jig (not shown), is formed by overlapping or superimposing the links 28 (the second embodiment) vertically, and the links 28 are connected to each other with connecting pins through a suitable number of hinge members like the second embodiment. In this case, the connecting pin is made as a through pin, which penetrates through the upper and lower links 28, 28 and the hinge member. Further, the link 39 may be composed of two or more overlapped links 28 or of integral member obtained by overlapping a plurality of arm members 28.

A holding frame, which supports a flexible connector, comprises, as shown in FIG. 8, a frame body 41 and mounting portions 42, 42 formed on one side of this frame body 41 vertically. The mounting portion 42 comprises a pair of plates 42b having an engagement portion 42a at their front edge portion. This holding frame 40 provides a receiver for the flexible connector which is removably attached to the transverse stiles or bridges 30, 30 of the links 28, 28 and the stile or bridge of a hinge member (not shown) by fitting the mounting portions 42 thereto with a length of a vertical width of the link 39.

Further, in the holding frame 40, connectors may be added or changed without dismounting the frames from the links. One side frame 41b is elastically deformable and bears against an upper frame 41a so that the flexible connector can be inserted into or removed from the side of the holding frame 40. Since this holding frame 40 has a large receiving portion, it is suitable for a case of a large number of flexible connectors, and insertion and removal of the flexible connectors become simple during the replacement or addition of flexible connectors. The elastic deformation of the side frame biases the receiver of the frame 40 to the closed position, but permits opening of the receiver to receive or discharge flexible connectors.

A modified example of a holding frame in the third embodiment is shown in FIG. 9. A holding frame 44, which supports a flexible connector, a frame body 45 and mounting portions 46, 46 formed on one side of this frame body 41 vertically. The mounting portion 46 comprises a pair of plates 46b having an engagement portion 46a at their front edge portion. This holding frame 44 is removably attached to the transverse stiles or bridges 30, 30 of the links 28, 28 and the stile or bridge of a hinge member (not shown) by fitting the mounting portions 46 thereto with a length of a vertical width of the link 39.

Further, the holding frame 44 forms a receiver for the flexible connector, and has an upper frame 45a which can be opened and closed using an articulating or bending portion 45b as a fulcrum so that the flexible connector can be inserted into or removed into or out of the receiver from the side of the holding frame 44. This upper frame 45a includes a hook 45c and this hook 45c engages an engagement portion 45e of a side frame 45d of the frame body 45. The hook and engagement portions 45c and 45e cooperate to latch the receiving portion of the frame 44 in the closed condition. Since this holding frame 44 has a large accommodating portion, it is suitable for a case of a large number of flexible connector, and insertion and removal of the flexible connector become easy during the replacement and addition of the flexible connector.

It is noted that although in the third embodiment, in place of a holding frame which is mounted on the link 39, one may use a holding frame which can insert and remove a flexible connector from a side or from above, as has been explained, the integral holding frame in which the frame body of the holding frame encloses and surrounds the flexible connector as in the first embodiment. Alternatively, a holding frame whose upper portion is opened to form an open receiver, as shown in FIG. 10, may be used. A holding frame having such a size that it can be separately attached to the upper and lower links 28, 28, respectively, may be used without having a vertical length of the link 39.

A fourth embodiment of the present invention will be described with reference to FIG. 10. A flexible connector guiding and holding jig (not shown) of the fourth embodiment is formed by connecting a plurality of links 48 to each other through a suitable number of hinge members with connecting pins as in the first to third embodiments.

The link 48 comprises an elongated plate arm 49 having expanded portions 50 on both end portions. In the expanded portions 50 on the both ends of the arm 49 are provided pin holes 48a through which connecting pins are inserted. First, a holding frame 52 shown on the left side of FIG. 10 will be described. The holding frame 52 comprises an upper portion-opened receiver 53 and a mounting portion 54 formed on one side of this receiver 53. The mounting portion 54 comprises a pair of pin members 54a, 54a.

Through holes are provided in the arm 49. By fitting the pin members 54a, 54a into the through holes 51 the holding frame 52 can be removably attached to the link 48. Since this holding frame 52 is opened in the upper portion, the insertion and removal of the flexible connector can be easily performed and replacement of the holding frame 52 can also be easily performed.

Next, a holding frame 55 shown on the right side of FIG. 10 will be described. The holding frame 55 comprises an upper portion-opened receiver 56 and a mounting member 57 formed on one side of this receiver 56. This receiver 56 includes a mounting frame 57a, and the holding frame 55 is removably attached to the link 48 by allowing the mounting frame 57a to engage the elongated plate arm 49. Since the receiver 56 is opened in the upper portion, the insertion and removal of the flexible connector can be easily performed and replacement of the holding frame 55 can also be easily performed.

In the flexible connector guiding and holding jig (not shown) of the fourth embodiment the holding frame 52 is attached to the link 48 by the mounting portion 54, or the holding frame 57 is attached to the link 48 by the frame 57a, the holding frame 52 or the holding frame 55 can be attached to any of a front surface, rear surface and both surfaces of the link 48 and a number of flexible connectors can be held without changing the sizes of the holding frames 52, 55. It should be noted that the holding frame 55 enables the pitch between frames to be adjusted incrementally, if the nature of the flexible connector makes it desirable to do so.

Figure 11A:
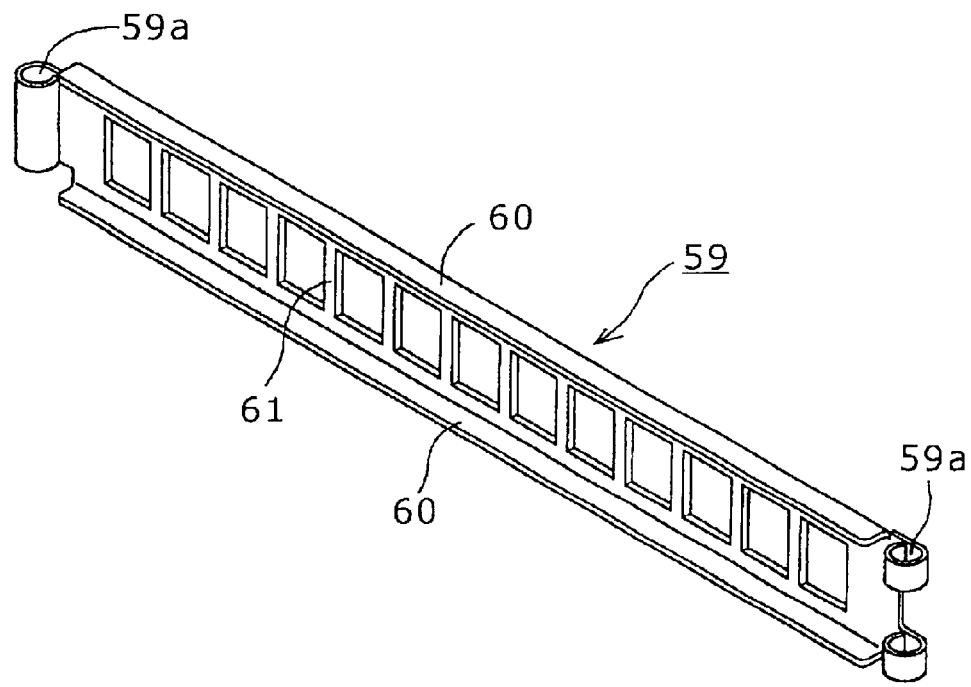
FIG. 11(A) is a perspective view of a linear arm member of a fifth embodiment.
Figure 11B:
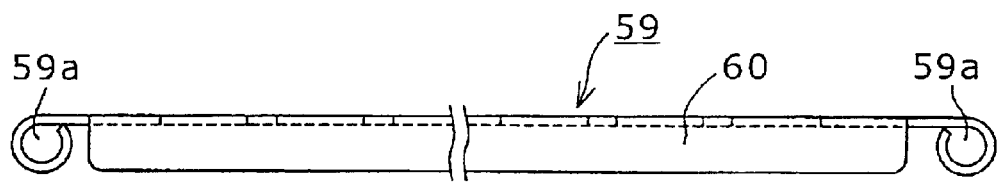
FIG. 11(B) is the plan view of FIG. 11(A).
Figure 11C:
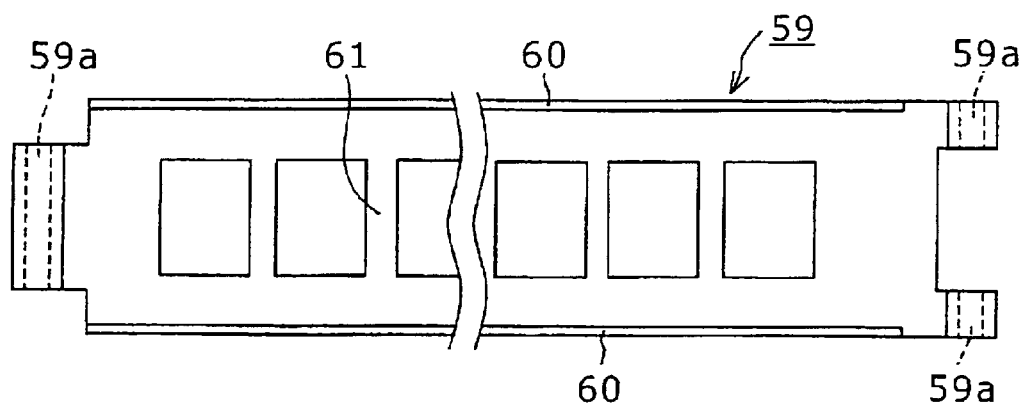
FIG. 11(C) is the side view of FIG. 11(A).
Figure 12:
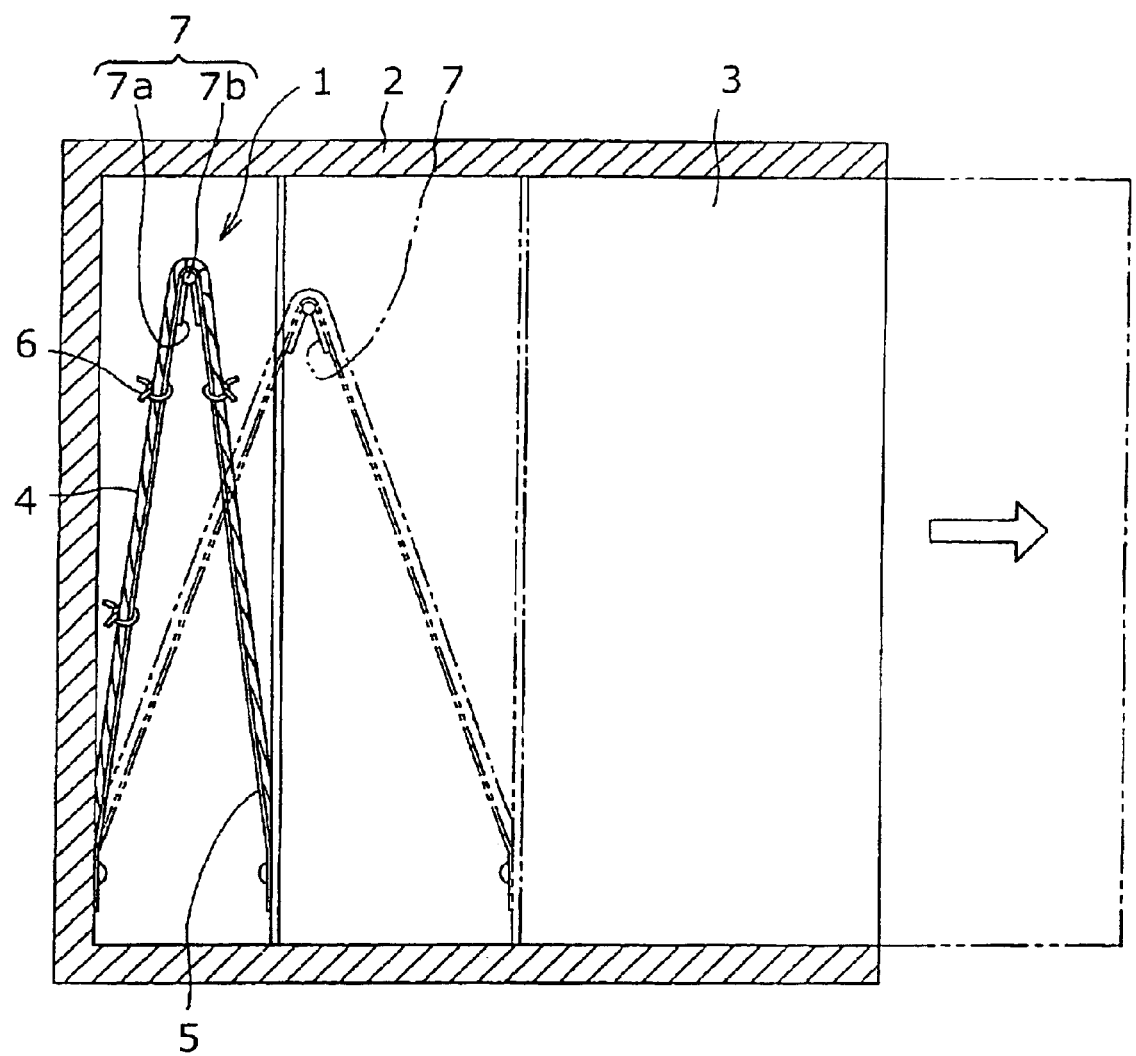
FIG. 12 is a conceptional view of a conventional flexible connector guiding and holding jig.

A fifth embodiment of the present invention will be described with reference to FIGS. 11A, 11B and 11C. A flexible connector guiding and holding jig (not shown) of the fifth embodiment is formed by connecting a plurality of links 59 to each other through a suitable number of hinge members with connecting pins as in the first to third embodiments.

The link 59 comprises a pair of arms 60 and transverse stiles or bridges 61 provided between the arms 60. At both ends of the link 59 are formed pin holes 59a through which connecting pins are inserted. Further, any holding frame, which can be removably attached to the link 59, may be used, specifically the frame can be attached like any one of embodiments in FIGS. 1 to 3. For example, like the holding frame 55 in the fourth embodiment, the holding frame can be attached to the link 59 by allowing the receiving frame 57 to engage a pair of arms 60 with any desired pitch between the frames.

The respective embodiments have been explained above, the link, the hinge member, the holding frame and the like can be formed of any material, such as synthetic resin, metal or other material. However, use of a synthetic resin is preferred for weight reduction and cost reduction.

As described above, in the drawing flexible connector guiding and holding jigs according to the respective claims, the holding frame, which supports the flexible connector is attached to the link and hinge member, and the links are connected to each other through the hinge member having pin holes on the both end portions. Thus, when the links are articulated in accordance with the extension or retraction of the pull-out unit, the flexible connector is supported on the holding frames without being restrained. The frames form stand-off members supporting the flexible cable spaced outwardly from the bodies of the links and the hinge members. During articulation of the jig, the stand off provided by the frames causes the connector to bend with an enlarged radius of curvature. Therefore application of excessive tension to the flexible connector can be prevented whereby breakage of the flexible connector due to tension, or sharp bends or creases can be prevented.

Preferably there are at least two hinge members between adjacent links, so as to reduce the bending radius of the flexible connector as the jig is articulated during extension and retraction of the pull-out unit. It has been found that when the connector is on the outside of the hinge, two hinge members are sufficient to avoid sharp bends, whereas when the connector is on the inside of the hinge, at least three members are desirable.

Since the holding frames, which support the flexible connector, are removably attached to the links and the hinge members, in a case of different size cables and/or flexible connectors having different diameters and numbers thereof, only the holding frames corresponding to the size of the flexible connector may be changed while using the links and the hinge portions as common members, resulting in excellent performance in cost. Further, since the holding frame may be formed as only a frame body, the holding frame can be constructed as a simple structure.

When the links are provided in a vertically overlapped or superimposed structure, a number of flexible connector can be held, and by changing the number of the overlapped or superimposed links the flexible connector guiding and holding jig can be formed in accordance with the number of the flexible connectors. A jig with overlapped or superimposed links is desirable where there are multiple flexible connectors which should be separated from one another. Further, when the holding frame is formed such that the flexible connector can be inserted into or removed from the side or from above, the insertion and removal of the flexible connector can be performed during replacement and addition thereof.

What is claimed is:

1. A flexible connector guiding and holding jig for guiding and holding a flexible connector mounted between a case body and a pull-out unit accommodated in said case body for retraction and extension, said flexible connector guide holding jig comprising at least first and second links, each having pin holes at their both ends, a hinge member having pin holes at its both ends connecting pins inserted in said pin holes of said links and said hinge member to afford articulation of said links and said hinge member, and holding frames for supporting the flexible connector removably attached to said links and said hinge member, whereby said holding frames bend said flexible connector while said links and hinge are articulated during retraction and extension of the pull-out unit, said bending effecting retraction or extension of the connector without causing sharp bends or breaks in the connector.

2. The flexible connector guiding and holding jig, according to claim 1, including additional links vertically overlapping or superimposed on said first and second links.

3. The flexible connector guiding and holding jig, according to claim 1, characterized in that each said holding frame has a receiver through which said flexible connector can be inserted or removed.

4. The flexible connector guiding and holding jig according to claim 3 wherein said receiver is closed on all sides.

5. The flexible connector guiding and holding jig according to claim 4 wherein said receiver has an opening on the side thereof.

6. The flexible connector guiding and holding jig according to claim 5 including a releasable closure for said opening.

7. The flexible connector guiding and holding jig according to claim 4 wherein said receiver has an opening on the top thereof.

8. The flexible connector guiding and holding jig, according to claim 7 including a releasable closure for said opening.

9. A flexible connector guiding and holding jig for guiding and holding a flexible connector mounted between a case body and a pull-out unit accommodated in said case body for retraction and extension, said flexible connector guide holding jig comprising at least first and second links, at least two first hinge members articulately connected between said first and second links to afford articulation of said links and said hinge members, and holding frames having receivers for supporting the flexible connector, said frames being removably attached to said links and said hinge members, said holding frames serving as stand-off members to support the flexible connector spaced outwardly from said links, whereby when said links and hinge are articulated during retraction and extension of the pull-out unit, the stand-off members bend said flexible connector, effecting retraction or extension of the connector without causing sharp bends or breaks in the connector.

10. The flexible connector guiding and holding jig according to claim 9, including third and fourth links and additional hinge members between said third and fourth links.

11. The flexible connector guiding and holding jig according to claim 10, wherein the stand-off members extend outwardly from the first hinge members between the first and second links, and inwardly from the additional hinge members between the third and fourth links, said first hinge members comprising at least two hinge members and said additional hinge members comprising at least three hinge members.

* * * * *